United States Patent
Park et al.

(10) Patent No.: US 7,158,335 B2
(45) Date of Patent: Jan. 2, 2007

(54) METHOD FOR RESONANCE IDENTIFICATION IN HARD DISK DRIVES

(75) Inventors: Cheol Hoon Park, Suwon (KR); Sang Hoon Chu, Santa Clara, CA (US); Yong Gwon Lee, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/096,556

(22) Filed: Apr. 1, 2005

(65) Prior Publication Data
US 2006/0221492 A1 Oct. 5, 2006

(51) Int. Cl.
G11B 5/596 (2006.01)
(52) U.S. Cl. .................................. 360/77.02
(58) Field of Classification Search ............ None
See application file for complete search history.

(56) References Cited

U.S. PATENT DOCUMENTS 6,643,080 B1 * 11/2003 Goodner et al. ............ 360/31
6,690,534 B1 * 2/2004 Ding et al. .............. 360/77.02
2003/0058558 A1 * 3/2003 Ottesen et al. ............ 360/31

* cited by examiner

Primary Examiner—Hoa T. Nguyen
Assistant Examiner—Mitchell Slavitt
(74) Attorney, Agent, or Firm—Ben J. Yorks; Irell & Manella LLP

(57) ABSTRACT

A hard disk drive that redefines a notch filter of the drive. The update process may include initially disabling all notch filters and inducing a seek operation of the disk drive heads. A position error signal is read during a settling time of the seek operation and processed to determine the frequency of the signal. The frequency is selected as a resonant frequency if the error signal magnitude exceeds a threshold value. The notch filter is then redefined in accordance with the selected resonant frequency. The controller may also perform a routine to determine whether the resonant frequency is above or below a Nyquist frequency. Unlike prior art techniques, the method disclosed can obtain the resonant frequency without sweeping the excitation signal of the disk drive voice coil motor.

12 Claims, 5 Drawing Sheets

METHOD FOR RESONANCE IDENTIFICATION IN HARD DISK DRIVES

BACKGROUND OF THE INVENTION

1. Field of the Invention

The present invention relates to a method for redefining a notch filter of a hard disk drive.

2. Background Information

Hard disk drives contain a plurality of magnetic heads that are coupled to rotating disks. The heads can magnetize and sense the magnetic fields of the disk to write and read data, respectively. The heads are coupled to an pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors. Each sector contains a number of servo bits that are read to produce a position error signal (PES). The PES is processed and used to center the heads on the tracks in accordance with a servo routine.

Movement of the heads from track to track may induce a resonant movement of the actuator arm at a resonant frequency. The resonant movement will cause an oscillating movement of the heads. The oscillating movement will increase the servo time required to center the heads. To compensate for such resonant movement the disk drives typically include a notch filter that filters out a band of frequencies centered about the resonant frequency. It is desirable to periodically update the centering frequency of the notch filter and generally redefine the filter. This is sometimes done by sweeping the excitation signal of the voice coil motor and then determine which frequency produces the greatest PES response. Sweeping the excitation signal can be a time consuming procedure. It would be desirable to redefine the notch filter in a more time efficient manner.

BRIEF SUMMARY OF THE INVENTION

A hard disk drive with a controller that can redefine a notch filter in the drive. The controller processes a position error signal generated during a settling time of a seek routine to determine a resonant frequency at which the error signal has a maximum amplitude. If the amplitude is above a threshold the notch filter may be redefined with the resonant frequency.

DETAILED DESCRIPTION

Disclosed is a hard disk drive that redefines a notch filter of the drive. The update process may include initially disabling all notch filters and inducing a seek operation of the disk drive heads. A position error signal is read during a settling time of the seek operation and processed to determine the frequency of the signal. The frequency is selected as a resonant frequency if the position error signal magnitude exceeds a threshold value. The notch filter is then redefined in accordance with the selected resonant frequency. The controller may also perform a routine to determine whether the resonant frequency is above or below a Nyquist frequency. Unlike prior art techniques, the method disclosed can obtain the resonant frequency without sweeping the excitation signal of the disk drive voice coil motor.

Figure 1:
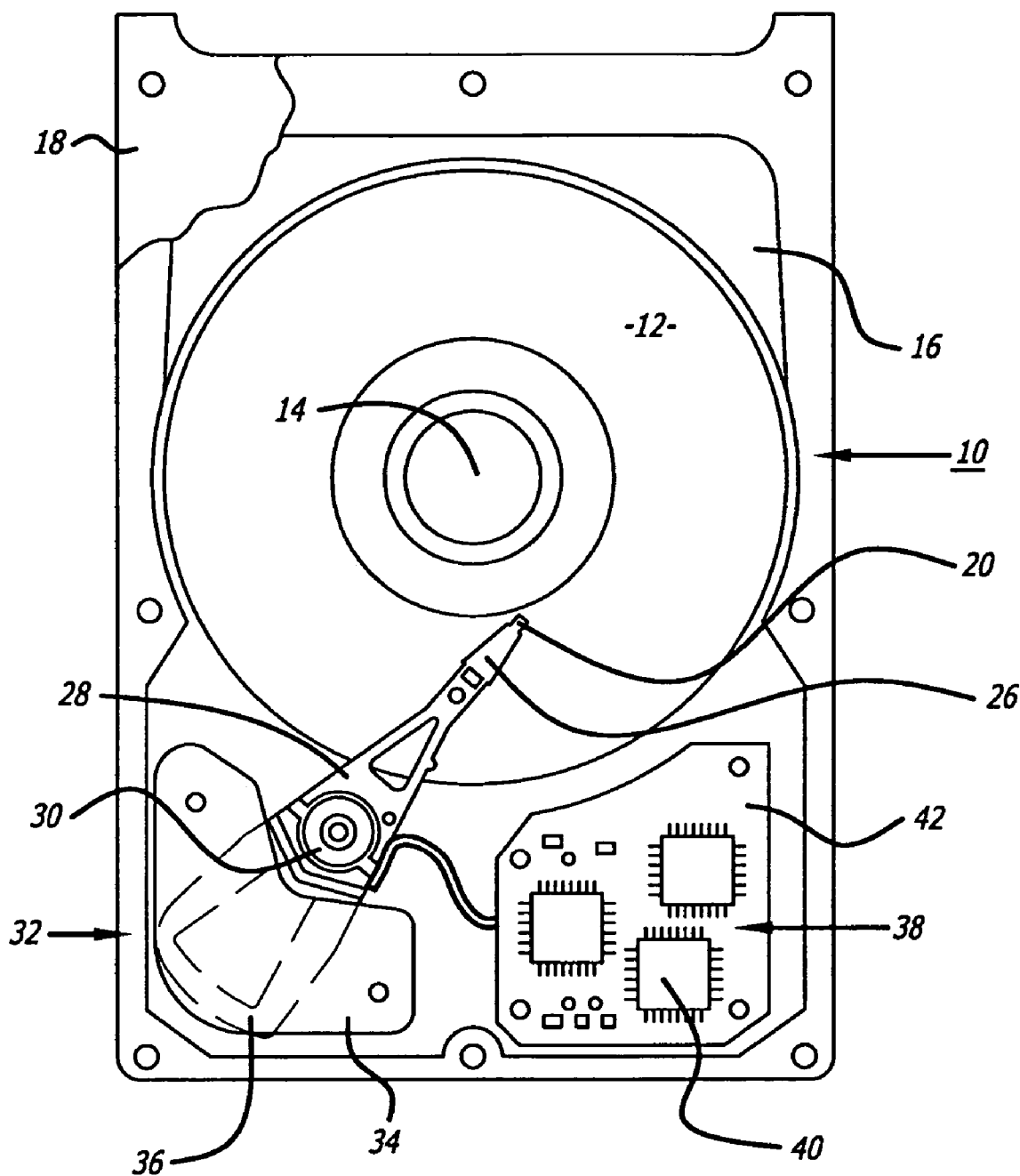
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
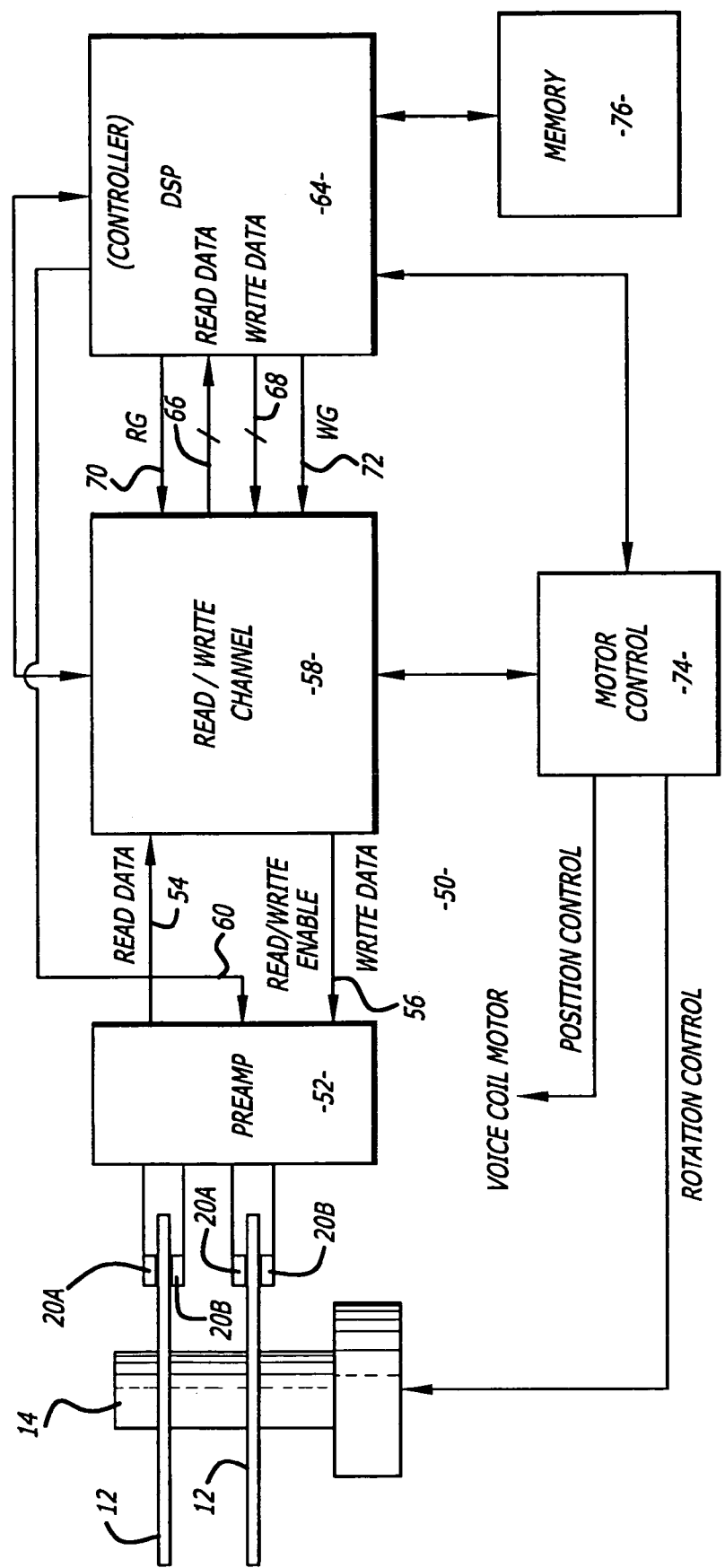
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM").

Figure 3:
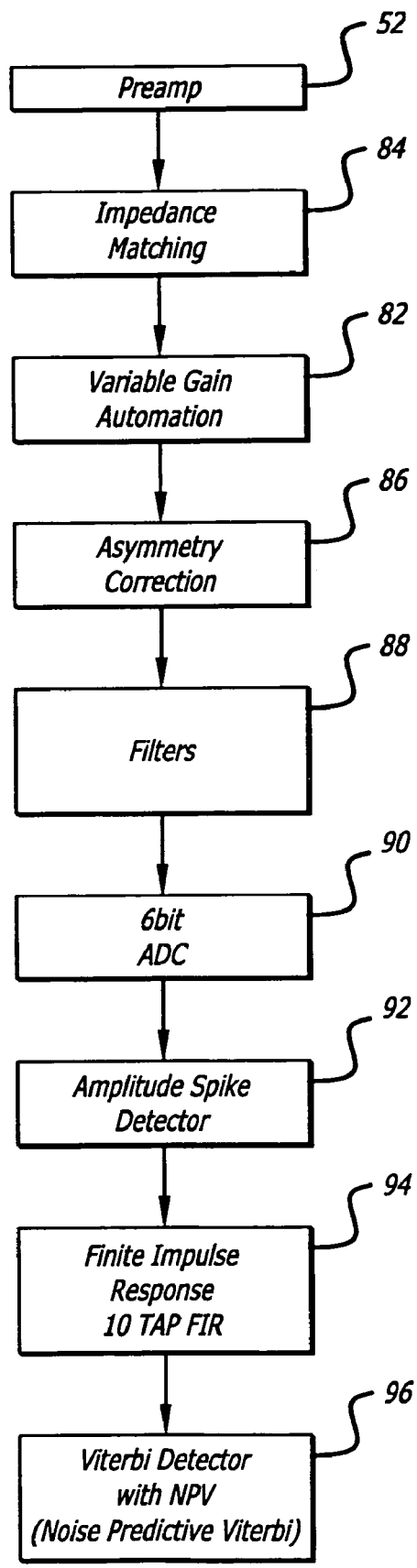
FIG. 3 is a schematic of a read channel of the electrical circuit.

FIG. 3 is a block diagram showing the different functional circuits for reading a disk. The functional circuits include an automatic gain control (AGC) circuit 82 coupled to the pre-amplifier 52 by a impedance matching circuit 84. The AGC circuit 82 provides automatic gain control of the waveform read from the disk.

The functional circuits may further contain an asymmetry correction circuit 86, filters 88, and an analog to digital converter 90 that condition, filter and convert the waveform to a digital bit string. The filters 88 may include a notch filter that filters out a band of signal frequencies. The band typically has a centering frequency equal to the resonant frequency of the heads suspended from the actuator arm. There may be a plurality of notch filters each with a different centering frequency. The filters 88 may also include a low pass filter. An amplitude spike detector 92 determines the existence of amplitude spikes in the signal. The bit string is provided to a finite impulse response (FIR) circuit 94 that provides finite impulse responses. The data is further provided to a viterbi detector 96, preferably a noise predictive viterbi.

Figure 4:
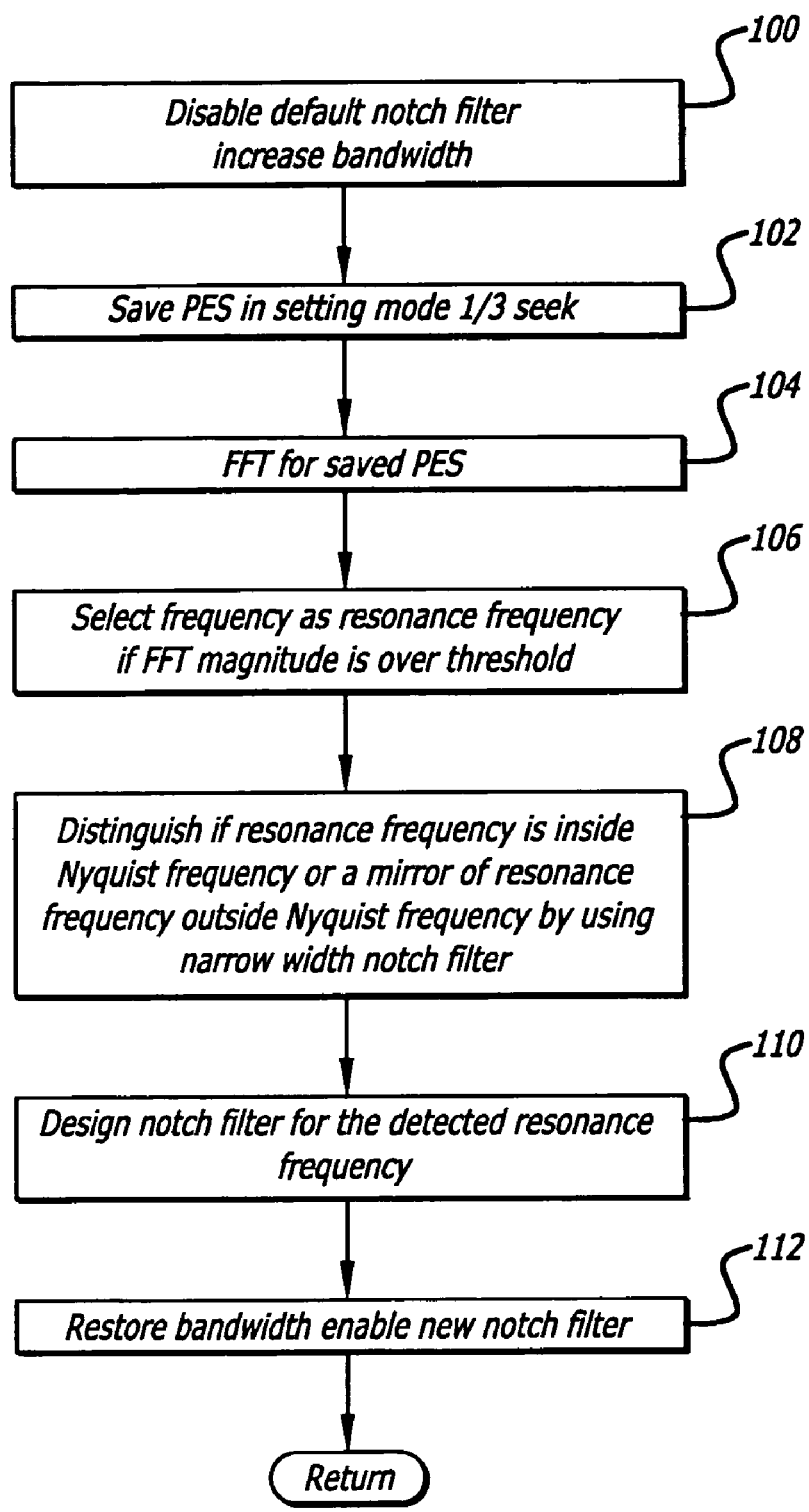
FIG. 4 is a flowchart of a process to redefine a notch filter in the drive.

FIG. 4 is a flowchart for a process to redefine a notch filter of the drive. The process can be performed in accordance with firmware instructions executed by the controller 64. The instructions can be stored in memory 76, memory of the controller 64, or both. In block 100 the notch filter(s) of the drive is disabled to increase the bandwidth of the heads. In block 102 the drive performs a seek operation, preferably over ⅓ of the disk surface, and a position error signal (PES) from the servo bits of the disk are read during a settling time of the heads.

In block 104, the PES is processed to determine a frequency of the error signal. In block 106, the frequency is selected as a resonant frequency if the amplitude of the PES is above a threshold value. In block 108, the process may determine whether the resonant frequency is below a Nyquist frequency or is a mirror resonant frequency above the Nyquist frequency. If the resonant frequency is below the Nyquist frequency the notch filter is defined with the new resonant frequency value in block 110. Redefinition may include changing the centering frequency of the notch to the new resonant frequency. The bandwidth of the notch may also be changed accordingly. After the notch filter is redefined the filter is enabled for further operation. This process may be performed during an idle mode of the drive. This process may be repeated for different notch filters to determine different resonant frequencies of the drive.

Figure 5:
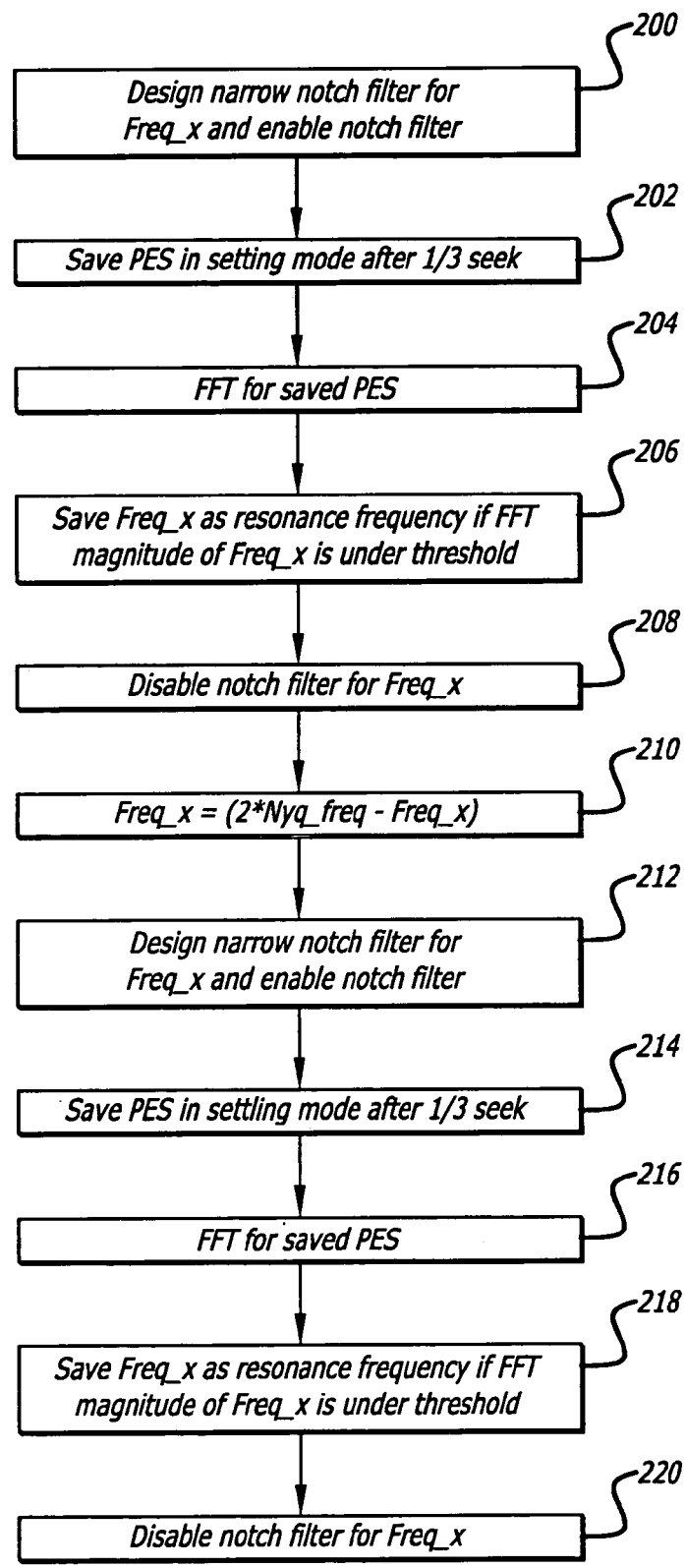
FIG. 5 is a flowchart of a process to determine whether a resonant frequency is below a Nyquist frequency.

FIG. 5 shows a process for determining whether the resonant frequency is below the Nyquist frequency. In block 200 the notch filter is defined for the new resonant frequency. A PES is read during the settling time of a seek operation and the frequency of the PES is determined in blocks 202 and 204, respectively. The resonant frequency is saved if the PES amplitude is less than the threshold in block 206.

In block 208 the notch filter is disabled. The resonant frequency is reset to the difference between twice the Nyquist frequency minus the resonant frequency in block 210. In block 212 the notch filter is again redefined with the reset resonant frequency. The filter preferably has a relatively narrow bandwidth. A seek is performed, a PES is read during the settling time and the frequency for the PES is determined and saved in blocks 214 and 216, respectively. If the PES is under the threshold the frequency is selected as the resonant frequency in block 218. The notch filter is disabled in block 220 and the process returns to the process shown in FIG. 4.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a spindle motor that rotates said disk;
   a head coupled to said disk;
   a notch filter coupled to said head;
   an actuator arm coupled to said head;
   a voice coil motor coupled to said actuator arm; and,
   a controller coupled to said head and said notch filter, said controller induces a seek operation of said head, processes a position error signal generated during a settling time, said controller determines a resonant frequency of said position error signal and redefines said notch filter with said resonant frequency during an idle mode.

2. The disk drive of claim 1, wherein said controller determines whether said resonant frequency is below a Nyquist frequency.

3. The disk drive of claim 2, wherein said controller redefines said notch filter, performs another seek operation, processes a position error signal generated during a settling time, determines a frequency of said position error signals and determines whether said position error signal is less than a threshold.

4. A hard disk drive, comprising:
   a disk;
   a spindle motor that rotates said disk;
   a head coupled to said disk;
   a notch filter coupled to said head;
   an actuator arm coupled to said head;
   a voice coil motor coupled to said actuator arm; and,
   a controller coupled to said head and said notch filter;
   a memory that contains a program which causes said controller to induce a seek operation of said head, processes a position error signal generated during a settling time, said controller determines a first resonant frequency of said position error signal and redefines said notch filter with said resonant frequency during an idle mode.

5. The disk drive of claim 4, wherein said controller determines whether said resonant frequency is below a Nyquist frequency.

6. The disk drive of claim 5, wherein said controller redefines said notch filter, performs another seek operation, processes a plurality of position error signal generated during a settling time, determines a maximum frequency of said position error signal and determines whether said position error signal is less than a threshold.

7. A hard disk drive, comprising:
   a disk;
   a spindle motor that rotates said disk;
   a head coupled to said disk;
   a notch filter coupled to said head;
   an actuator arm coupled to said head;
   a voice coil motor coupled to said actuator arm; and,
   controller means for inducing a seek operation of said head, processing a position error signal generated during a settling time, said controller determining a resonant frequency of said position error signal and redefining said notch filter with said resonant frequency during an idle mode.

8. The disk drive of claim 7, wherein said controller means determines whether said resonant frequency is below a Nyquist frequency.

9. The disk drive of claim 8, wherein said controller means redefines said notch filter, performs another seek operation, processes a position error signal generated during a settling time, determines a frequency of said position error signal and determines whether said position error signal is less than a threshold.

10. A method for redefining a notch filter of a hard disk drive, comprising:
  inducing a seek operation of a head;
  processing a position error signal during a settling time;
  determining a resonant frequency of the position error signal; and
  redefining a notch filter with the resonant frequency during an idle mode.

11. The method of claim 10, further comprising determining whether the resonant frequency is below a Nyquist frequency.

12. The method of claim 11, further comprising performing another seek operation, processing a position error signal generated during a settling time, determining a frequency of the position error signal, and determining whether the position error signal is less than a threshold.

* * * * *